Nov. 11, 1969     E. T. BUCKERRIDGE ET AL     3,478,181
ELECTRIC CIRCUIT CONTROLLERS INCORPORATING TIME-SWITCHES
Filed March 1, 1967     3 Sheets-Sheet 1
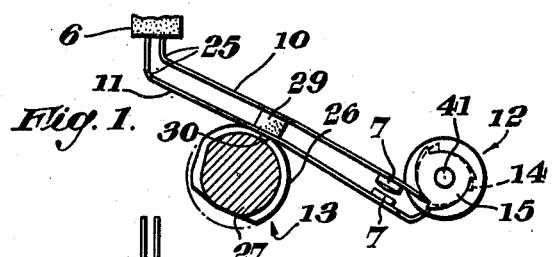
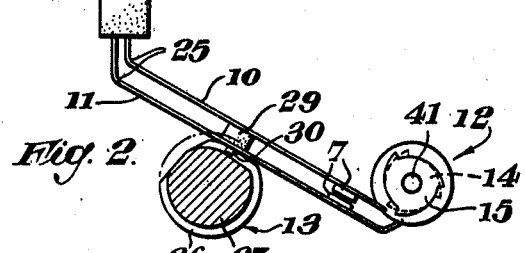
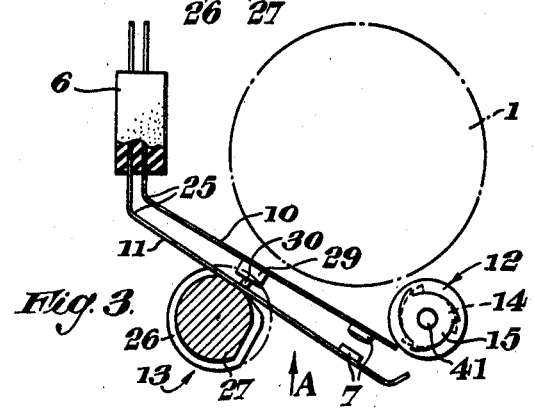
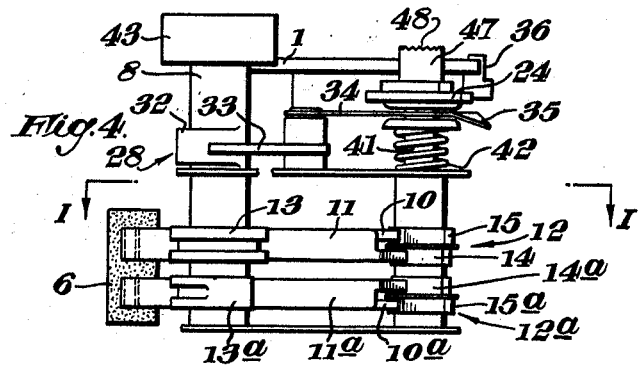

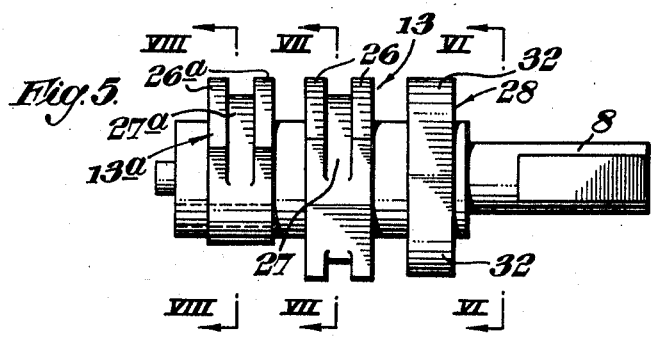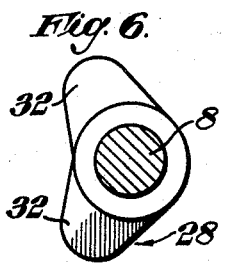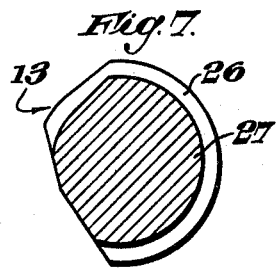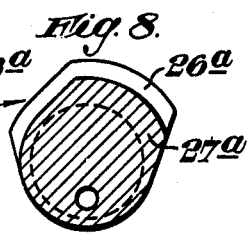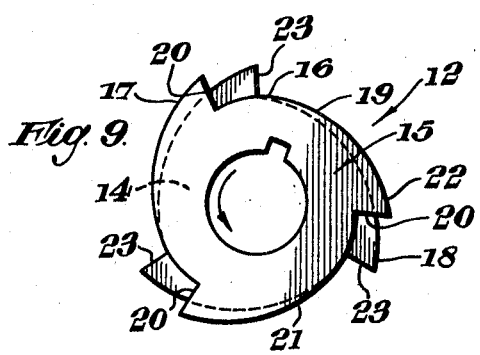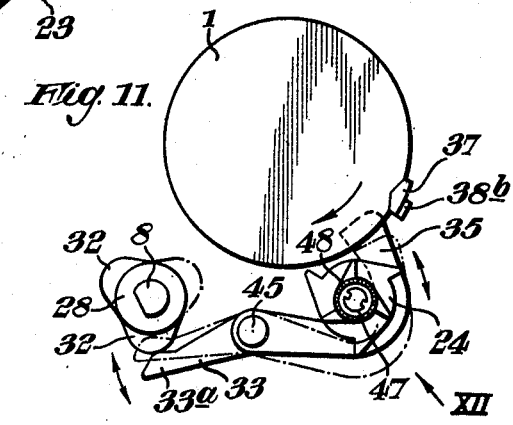

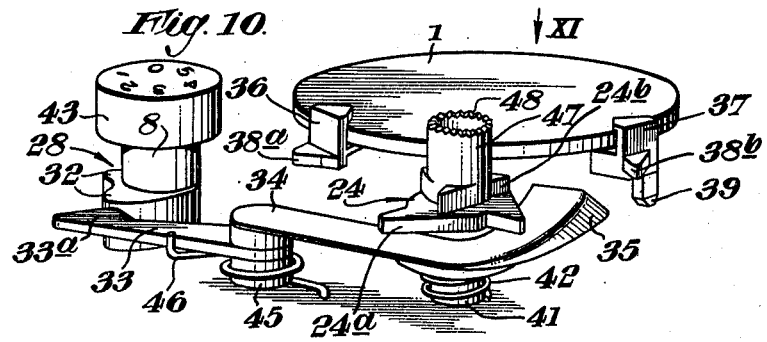
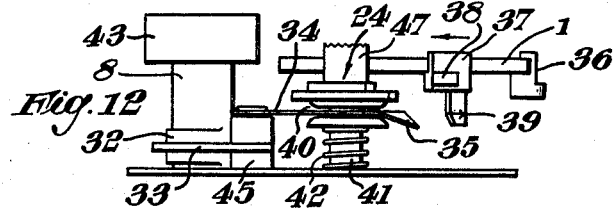
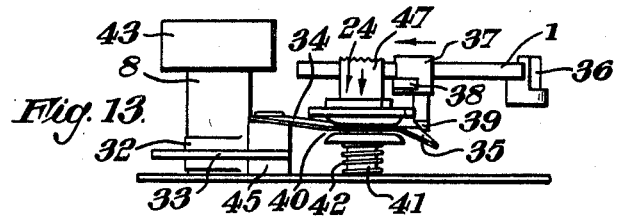
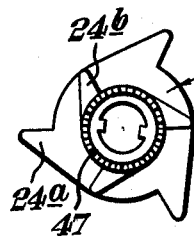
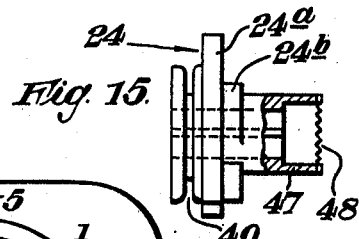
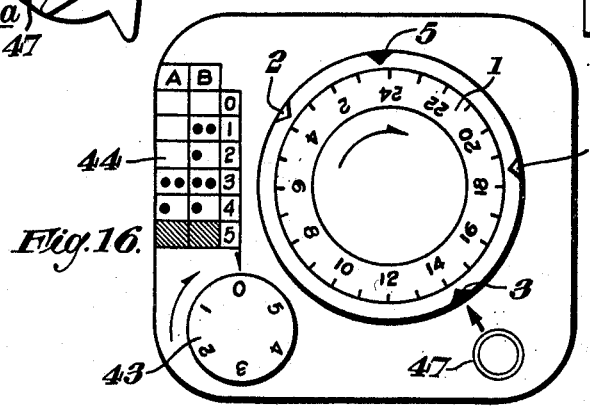

United States Patent Office 3,478,181
Patented Nov. 11, 1969

3,478,181
ELECTRIC CIRCUIT CONTROLLERS INCORPORATING TIME-SWITCHES
Edward Thomas Buckerridge, Alan Victor Jones, and William Clifford Rayward, all of Newbridge Works, Bath, Somerset, England
Filed Mar. 1, 1967, Ser. No. 619,700
Claims priority, application Great Britain, Mar. 10, 1966, 10,538/66
Int. Cl. H01h 7/08, 43/10
U.S. Cl. 200—38
2 Claims

ABSTRACT OF THE DISCLOSURE

Electric circuit controller with clock mechanism which changes a circuit including an adjustable cam acting on a contact carrier of a switch of the controller to provide an over-riding condition where the switch is independent of the clock mechanism.

---

This invention relates to electric circuit controllers incorporating time-switches, particularly to controllers of the kind which is adapted to control a circuit or a plurality of circuits and has means for selecting any one of a number of programmes of switching cycles of the circcuits or circuits within the unitary period determined by the clock mechanism of the mechanically or electrically driven time-switch.

Such controllers are, for instance used for controlling two separate circuits in such a manner that the circuits may be simultaneously or independently operated by the time-switch or either one or both of the circuit may be made independent of the time-switch.

In the case of a single circuit to be controlled by a time-switch, the known controller may be adapted to make the circuit independent of the time-switch for any desired period during which the time-switch, being a continuously driven clock, will continue to cycle so that the circuit can again be put under the control of the time-switch without it being necessary to reset the time-switch.

Such controllers have incorporated rotary or push-button switches for selecting any one of a number of programmes of cyclical control of the circuit or plurality of circuits. An object of the invention is to eliminate such rotary or push button switches, thereby to increase reliability by at least reducing the number of soldered joints, switch contacts and wiring connections, to provide simplification and reduce cost, and to largely remove the problem of electrical feedback when the control is used in conjunction with other controls such as thermostats.

In accordance with the invention, a circuit controller, incorporating a time-switch comprising a mechanically or electrically driven clock mechanism and a switch actuable thereby for cyclically changing the condition of a circuit, includes a cam which is manually adjustable to any one of more than one movable switch contact carrier to provide at least one over-riding condition in which the switch is independent of the clock mechanism.

Preferably the adjustable cam will provide one over-riding condition in which the switch is closed and another in which the switch is open.

The switch may comprise two contact carriers of which at least one is adapted to operatively engage a cam adapted to be actuated by the clock mechanism to cyclically open and close the switch, the adjustable cam being adapted to move the contact carrier out of engagement with the clock-actuated cam.

Preferably there will be two switch contact carriers and the adjustable cam will be operative thereon to open and close the switch.

The contact carriers may be resilient blades normally biased out of engagement with the clock-actuated cam into one switching condition, being movable by the adjustable cam into a second switching condition in which the blades are also out of engagement with the clock-actuated cam, and into a third switching condition in which the blades are entirely operable by the clock-actuated cam.

In accordance with another aspect of the invention, there is provided, in operative association with the adjustable cam, a further cam which is adjustable into at least one position in which it over-rides or puts out of operation a mechanical connection between the clock and the clock-actuated cam to render the clock inoperative upon the clock-actuated cam for at least a predetermined portion of the time cycle.

The further adjustable cam may be adapted to move a deflector into the path of a tappet driven by the clock, the deflector being engageable by the tappet approaching an operative position and thereby to move out of the path of the tappet a member through which the tappet would otherwise drive the clock-actuated cam to exect a switching operation.

In the case of a clock provided with a succession of pairs of tappets, of which each pair represents the beginning and end of a given circuit condition, such a deflector may be provided on one or more tappets of a group of two or more successive pairs to provide for the circuit condition to be extended beyond that set by any given tappet or tappets.

There may be provided a multiple of switches actuable by the clock mechanism and each adapted to separately control one of a corresponding multiple of circuits and being separately associated with a corresponding multiple of manually and simultaneously adjustable cams each adapted to provide the over-riding condition in which its switch is independent of the clock mechanism.

With such a multiple switch arrangement, there may be provided a form of said further cam adapted to over-ride the mechanical connection between the clock mechanism and the cam which it actuates, such further cam being adapted to be effective in association with any one switch or all the switches or selected switches.

Where there is more than one switch, there will preferablly be a corresponding number of the cams adapted to be actuated by the clock mechanism.

The improved controller is suitable for use in a time-switch for controlling a heating system having one circuit controlling a heater and another controlling a circulating pump, in which each circuit is required to be permanently "on" or "off" independently of the other circuit, each circuit is required to be cycled by the clock mechanism simultaneously with or independently of the other circuit and, in accordance with the second aspect of the invention, the length of the "on" periods may require to be altered as by over-riding the action of the clock mechanism for each circuit independently of or simultaneously with the other circuit.

A time-switch actuated controller embodying the invention and adapted for controlling two circuits in a heating system will now be described by way of example and with reference to the drawings herewith.

FIGURES 1, 2 and 3 represent three conditions of a modified Arksberger switch as seen in the direction of the arrows on the line I—I in FIGURE 4;

FIGURE 4 is a view in the direction of the arrow A in FIGURE 3;

FIGURE 5 is a side view of a cam assembly which is shown as part of FIGURE 4;

FIGURES 6, 7 and 8 are sectional views on the lines VI—VI, VII—VII and VIII—VIII respectively in FIGURE 5;

FIGURE 9 is a diagrammatic view, on a larger scale, of the Arksberger cam member shown in FIGURES 1–3;

FIGURE 10 is a perspective view of the time-switch dial in association with other elements;

FIGURE 11 is a view in the direction of the arrow XI, which is parallel to the axis of the dial, in FIGURE 10;

FIGURES 12 and 13 are views, in the direction of the arrow XII in FIGURE 11, representing two successive angular positions of the dial;

FIGURE 14 is an axial view of the star wheel shown in FIGURE 10, as seen in the direction of the arrow XI;

FIGURE 15 is a view of the star wheel in a radial direction and partly in section on a diametrical plane; and FIGURE 16 is an external view of the complete controller.

Referring to FIGURE 16, the controller is adapted to switch on and off two circuits, indicated by columns A and B of a programme code 44, of which A is the control circuit for a circulating pump and B is the main heater control circuit. The time-switch dial 1 provides four switching operations in 24 hours, the successive switching positions being "on" 2, "off" 3, "on" 4 and "off" 5, providing basically two successive "on" periods 2–3 and 4–5. The switching times determined by the time-switch are the same for both circuits, except as hereinafter indicated. For instance, during winter the full heat corresponding to energization of both circuits may be required throughout the day, except for an "off" period at night, whereas in spring and summer the full heating may be required only for a morning and an afternoon period. Also, during the summer central heating will normally not be required so that the pump can remain permanently unoperated whereas the main heater may require to be switched on to provide hot water for other purposes. In the code 44 a dot in a column represents an "on" period; there are represented six programme conditions which are selectable by the manually and angularly adjustable knob 43 having six corresponding positions. The six conditions are as follows:

(0) Both circuits A and B permanently "off."
(1) Circuit A is permanently "off"; circuit B is "on" for two successive periods during the day.
(2) Circuit A is permanently "off"; circuit B is "on" for one long period during the day.
(3) Circuits A and B are simultaneously "on" for two successive periods during the day.
(4) Circuits A and B are simultaneously "on" for one long period during the day.
(5) Circuits A and B are permanently "on."

The time-switch dial 1 carries four tappets, there being shown in FIGURE 10 an "on" tappet 36 and an "off" tappet 37 corresponding to, for instance, the "on" and "off" positions 2 and 3 of FIGURE 16. Adjacent to the dial 1 is mounted a star wheel 24 which is keyed to a cam shaft 41 on which is also keyed an Arksberger switch cam member comprising two cams 12, 12a (see FIGURES 1–4 and 9) which are the clock-actuated cams. The star wheel 24 has six lobes uniformly spaced 60° apart and in two coaxial groups which are side-by-side and each comprise three lobes set 120° apart, one group being off-set 60° relatively to the other group. The lobes 24a of one group are radially longer and nearer the dial 1 than the lobes 24b of the other group. The lobes 24a are adapted to be engaged by an operative part 38a of each "on" tappet 36, and the other lobes 24b are adapted to be engaged by a similar operative part 38b of each "off" tappet 37, the first mentioned operative parts 38a being set nearer the dial 1 so as to miss the lobes 24b. Except as hereinafter described the star wheel 24 will be turned 60° by the passage of each tappet in turn.

The star wheel 24 is formed on one side with an axial extension 47 enabling the star wheel to be depressed against the spring 42 to disengage the star wheel from the path of the tappets when it may be turned to the next switch condition manually simulating the passage of a tappet and thus anticipating the operation of the approaching tappet. The annular array of serrations 48 is provided to form a finger grip.

The switches are of the Arksberger type. Referring to FIGURES 1–4, one of the switches comprises two parallel resilient blades 10, 11, fixed at their inner ends in a common insulating mounting 6 with the tips of the blades 10, 11 adapted to engage co-axial formations 14, 15 respectively of the clock actuated cam 12. The blades 10, 11 are formed with bends 25 near their inner ends so as to be normally biassed out of engagement with the cam formations 14, 15 but the blades are separately engageable in an intermediate position by a programme selecting cam member 13 which is manually controllable by the selector knob 43, whereby the blades 10, 11 can be individually displaced against the inherent biasing force into engagement with the cam 12. On their opposed faces the blades 10, 11 each carry a switch contact 7, the Arksberger switch being closed when the contacts 7, 7 are in mutual engagement, as in FIGURE 2.

The cam formation 15, as shown in FIGURE 9, comprises three identical cam surface formations each extending over an 120° arc and smoothly rising from the bottom of a radial step 20 of the previous cam surface formation to the top of the next radial step 20, the cam 12 being adapted to be rotated in the direction of the arrow. The other cam surface formation 14, being behind the cam surface formation 15 in FIGURE 9, has radial steps 23 and is similar to but angularly displaced from the cam formation 15 which leads by about 30°.

For the purpose of the immediately following description it is assumed that the switch blades 10, 11 are urged by the programme selection cam member 13 in the sense to engage the cam surface formations 14, 15 as in FIGURE 1. It has already been indicated that the star wheel 24 and the cam 12 are keyed to the same shaft 41, so that the engagement of the star wheel 24 by a tappet 36 or 37 will turn the cam 12 through 60°. Referring to FIGURES 1 and 9, the initial condition is represented by the blade 10 bearing at 16 against a low "on" cam formation 14, and blade 11 bearing at 17 against a high "on" cam formation 15, so that (FIGURE 1) the Arksberger switch contacts 7, 7 are apart and the switch is open. At the end of the next 60° movement of the cam 12, blade 10 will bear at 18 against a high "on" cam formation 14, whereas the other blade 11 will have dropped at a step 20 to engage at 19 a low "on" cam formation 15, so that the Arksberger switch contacts 7, 7 are together and the switch is closed. At the end of the next 60° movement the initally closed condition (FIGURE 1) of the switch will have again been attained, the blade 10 having dropped at a step 23 to engage at 21 a low "on" cam formation 14 and the other blade 11 now having been lifted to a high at 22 on the cam formation 15. Thus, unless an overriding influence is present, successive actuations of the star wheel 24 will alternately open and close the Arksberger switch.

Referring now to FIGURE 3, the blade 10 carries an insulating mounting 29 for an insulating pin 30 which projects freely through the other blade 11 to engage one cam surface 27 (FIGURE 7) of the programme selecting cam member 13, whereas the other blade 11 is directly engaged by a second cam surface 26 of the cam member 13. The combined dimensions of the mounting 29 and pin 30 is such that when both the blade 11 and the pin 30 on the blade 10 bear on lows on the cam surfaces 26, 27 the condition is as shown in FIGURE 3 with the tips of the blades 10, 11 out of engagement with the cam formations 14, 15 of the cam 12 and the blades so far separated tha the contacts 7, 7 are apart and the switch is permanently open. In the intermediate condition (FIGURE 2), with the blade 11 engaged by a midlevel of the cam surface 26 and the pin 30 on the blade 10 by a low "on" cam surface 27, the switch contacts 7, 7 are together but the tips of the blades 10, 11 are still biassed away from the cam 12 so that the switch is permanently closed. In the other extreme condition (FIGURE 1) both blades 10, 11 are displaced, in opposition to their inherent bias, by highs on the respective cam surfaces 26, 27 so that the tips of the blades are in engagement with the cam formations 14, 15 of the cam 12 and the opening and closing of the is witch is entirely controlled by the movement of the dial 1 and the star wheel 24.

The control shaft 8 operatively engaged by the knob 43 carries a separate programme selecting cam member for each circuit to be controlled; in the illustration, cam member 13 is associated with circuit A and a similar cam member 13a with cam surfaces 26a, 27a, is associated with circuit B. Correspondingly there are provided two Arksberger switches comprising blades 10, 11 and 10a, 11a and, on the cam shaft 41 to which the star wheel 24 is keyed, two cams 12, 12a with the respective cam formations 14, 15 and 14a, 15a. The construction and manner of operation of the second switch with blades 10a, 11 a, and the associated cams 12a, 13a are similar to those of the already described switch and associated cams.

In the present illustration the control shaft 8 also carries a time-switch over-riding cam member 28 having two lobes 32, 32 (FIGURE 6) set 120° apart. Referring to FIGURES 10–12, the lobes 32, 32 are engageable by a followers 33a on the end of lever arm 33 which is pivoted at its other end on an axis 45 and is biassed into engagement with the cam 28 by a spring 46. On the same pivotal axis 45 and fast with the lever arm 33 is a spring lever arm 34 having its free end in the form of an inclined tip 35, and at an intermediate position along its length engaging in an annular groove 40 in the star wheel 24.

The star wheel is slidable axially on its shaft 41 and is normally biassed by a spring 42 into the position for operative engagement by the time switch tappets 36, 37. On one of the "off" tappets, for instance the "off" tappet 37 in FIGURES 10–12, there is provided an axially projecting cam form 39. When the follower 33a is not engaged by a cam lobe 32, the tip 35 of the spring lever arm 34 is in such a position that it is out of the path of the cam form 39 on the "off" tappet 37, so that the time switch will be actuated in succession by all the tappets. When the follower 33a is engaged by a cam lobe 32, the lever combination 33, 34 is rocked in the sense to bring the tip 35 into the path of the cam form 39 as the "off" tappet 37 on which it is provided approaches the star wheel 24; the cam form 39 displaces the tip 35 and flexes the spring lever 34 in the sense to displace the star wheel, against its spring 42, to such a position that the star wheel 24 will not be operatively engaged by the normally operative part 38b of the "off" tappet 37. Thus in the arrangement illustrated in FIGURES 10–12, any circuit or circuits controlled by the time switch in the sense of being switched on by the "on" tappet 36 will not next be switched off by the "off" tappet 37 provided with the cam form 39 when the lever combination 33, 34 is in the condition to bring the tip 35 into the path of the cam form 39. The passage of the next "on" tappet 36 will be ineffective since, by the previous passage of an "on" tappet, the star wheel 24 will have been turned into such a position that none of its lobes 24a is engageable by an operative part 38a of an "on" tappet. The star wheel 24 will thus not be again actuated until the passage of an "off" tappet 37 not having a cam form 39. In the present illustration, where the sequence of operative positions of the time switch is "on" 2, "off" 3, "on" 4 and "off" 5, the appropriate cam form 39 would be provided on the "off" tappet 37 corresponding to the first "off" position, so that there is provision for two successive "on" periods 2/3, 4/5 or one long "on" period 2/5.

By appropriately shaping the cams 28, 13 and 13a and setting with the required angular relationship on the control shaft 8, the aforementioned six programmes are determined as follows:

(0) Both cams 13, 13a are so set that both pairs of contact carrying blades 10/11, 10a/11a are as shown in FIGURE 3, with contacts 7, 7 apart and thereby both switches open and both circuits A, B unenergised.

(1) Cam 13 is set so that the switch having contact carrying blades 10, 11 is open in FIGURE 3 so that circuit A is permanently unenergised. The other cam 13a is set so that the tips of its contact carrying blades 10a, 11a engage the cam formations 14a, 15a of cam 12a, corresponding to the condition shown in FIGURE 1; circuit B is thus controlled by the time switch; the cam follower 33 is not engaged by a cam lobe 32, so that circuit B is energisable for two periods a day.

(2) The condition is as in 1 (above) except the cam follower 33a is engaged by a cam lobe 32 and thereby the circuit B is caused to be energised for one long period a day.

(3) The cams 13, 13a are so set that the contact carrying blades of both switches are in engagement with the cams 12, 12a, as represented in FIGURE 1, but the cam follower 33a is not engaged by a cam lobe 32, so that both circuits A, B are simultaneously energisable for two successive periods a day.

(4) The condition is as in 3 (above) except that the cam follower 33a is engaged by a cam lobe 32 and the time switch is over-ridden in the sense to cause both circuits A, B to be simultaneously energisable for one long period a day.

(5) Both cams 13, 13a are so set that the contact carrying blades of both switches are out of engagement with the cams 12, 12a but with their contacts 7 together, as represented in FIGURE 2, so that both switches are permanently closed and both circuits A, B are permanently energised.

Other instances of the use of the invention are in time switches for the control of the circuits of cyclically operating processes such as in washing and drying machines for laundering and dishwashing. In a domestic laundering machine the following operations may require independent circuits:

(a) Water filling control by solenoid valve.
(b) Water heating.
(c) Tumbling or other slow washing action.
(d) Spin drying.
(e) Emptying by means of pump.

It may be required to combine some of the stages, as for instance a/c, b/c and/or d/e. Also it may be required to repeat some of the steps, for instance to effect rinsing. By means of the invention there can be made provision for a number of independently selectable circuits or programmes involving appropriate groups of the available circuits.

We claim:
1. A circuit controller incorporating a clock mechanism and a switch actuatable by the mechanism for cyclically changing the condition of a circuit, wherein a manually adjustable cam is fastened on a first spindle which is angularly adjustable manually into any one of three positions, a driven cam is fastened on a clock-driven spindle which is parallel to the first spindle, the switch comprises two substantially parallel spaced resilient contact-carrying blades fastened at one and the same end of each blade in a fixed mounting, extending from the mounting transversely of the first spindle with the other free ends of the blades adjacent to the driven cam, and biassed in the sense to engage the manually adjustable cam at positions intermediately of the ends of the blades and to disengage the driven cam at their free ends, a contact on one blade is in register with a contact on the other blade so that the contacts can be brought into mutual engagement by flexing the blades towards one another and can be separated by flexing the blades away from one another, the manually adjustable cam has three lobe formations corresponding to the three positions of the first spindle and operative on the blades in the first position of the first spindle to flex the blades apart and to separate their contacts from one another and disengage their free ends from the driven cam, in the second position of the spindle to flex the blades together with their contacts in engagement with one another and their free ends disengaged from the driven cam, and in the third position of the first spindle to flex the blades with both free ends thereof engaging the driven cam, and the driven cam is contoured to cyclically open and close the switch by flexing the blades relatively to one another and successively in one sense to separate their contacts and in an opposite sense to bring their contacts into mutual engagement, when in the third position of the first spindle the free ends of the blades engage the driven cam, whereby there are provided two different over-riding conditions of the switch wherein the switch is independent of the driven cam and a third condition in which the switch is entirely operable by the driven cam.

2. A circuit controller as claimed in claim 1, incorporating a clock-driven dial, tappets fastened to the periphery of the dial, a star wheel coaxial with the driven spindle and axially slidable on the spindle into and out of an operative position wherein arms of the star wheel extend into the circular paths of the movement of the tappets with the dial, a spring biassing the star wheel into its operative position, a drive-transmitting coupling between the star wheel and the driven spindle, a further manually adjustable cam and a lever spring-biassed into engagement with the further cam, the lever having a portion engaging the centre of the star wheel and the portion being flexible to move with the star wheel sliding on the driven spindle, and an extension of said portion having a deflector formation adjacent to the dial, the further cam having at least one cam lobe which, when the further cam is adjusted to an operative position, is operative on the lever to displace said deflector formation inwards towards the centre of the dial, and at least one of the tappets has an extension engageable with the deflector formation, when said deflector formation is so displaced by the further cam being in its operative position, to flex said portion of the lever to slide the star wheel, on the driven spindle, out of its operative position, whereby when the further cam is adjusted out of its operative position the star wheel, and thereby the driven spindle and driven cam, is drivable in step-by-step rotation by the tappets on the dial, and when the further cam is in its operative position said one of the tappets approaching the star wheel will, by the engagement of the tappet extension with the deflector formation, turn the lever to slide the star wheel out of the path of that tappet so that the sar wheel, driven spindle, driven cam and thereby the switch will not be actuated by the movement of that tappet past the star wheel.

References Cited

UNITED STATES PATENTS

| 2,078,781 | 4/1937 | Sprenger et al. | 200—38 |
| 2,582,285 | 1/1952 | Schellens | 200—38 |
| 3,185,874 | 5/1965 | Hunt et al. | 200—38 |
| 3,204,050 | 8/1965 | Berg | 200—38 |

HERMAN O. JONES, Primary Examiner